US008019500B2

(12) United States Patent
Oesterling et al.

(10) Patent No.: US 8,019,500 B2
(45) Date of Patent: Sep. 13, 2011

(54) VEHICLE DIAGNOSTIC INTERFACE MECHANISM

(75) Inventors: Christopher L. Oesterling, Troy, MI (US); John Correia, Livonia, MI (US); Carl J Hering, Farmington Hills, MI (US); Nathan Ampunan, Novi, MI (US)

(73) Assignee: General Motors LLC, Detroit, MI (US)

( * ) Notice: Subject to any disclaimer, the term of this patent is extended or adjusted under 35 U.S.C. 154(b) by 1249 days.

(21) Appl. No.: 11/618,377

(22) Filed: Dec. 29, 2006

(65) Prior Publication Data

US 2008/0161988 A1 Jul. 3, 2008

(51) Int. Cl.
*G01M 17/00* (2006.01)

(52) U.S. Cl. .......................................... 701/29; 702/122

(58) Field of Classification Search .............. 701/29–33, 701/35, 2; 340/989–993, 439; 702/122–123, 702/188

See application file for complete search history.

(56) References Cited

U.S. PATENT DOCUMENTS

| | | | | |
|---|---|---|---|---|
| 6,879,894 | B1 | 4/2005 | Lightner et al. | |
| 7,478,492 | B2 * | 1/2009 | Madonia | 40/591 |
| 2006/0071766 | A1 * | 4/2006 | O'Brien et al. | 340/442 |
| 2007/0112444 | A1 * | 5/2007 | Alberth et al. | 700/32 |
| 2008/0033609 | A1 * | 2/2008 | Razavi | 701/33 |

* cited by examiner

*Primary Examiner* — Dalena Tran

(74) *Attorney, Agent, or Firm* — Leydig, Voit & Mayer, Ltd.

(57) ABSTRACT

In examples of the invention, a vehicle diagnostics update mechanism provides a frequent connection to a vehicle telematics unit. In this way, large amounts of vehicle data that are available when the vehicle is on or cached, i.e., when the vehicle is off, can be pulled and used to provide a vehicle update to the user. In one example, a "vehicle dashboard" application running on a vehicle owner's computer in the form of a tool bar provides diagnostics updates in a quick and easy to use format. The tool bar also provides a means for executing user selections and commands and for providing alerts to the user.

9 Claims, 7 Drawing Sheets

VEHICLE DIAGNOSTIC INTERFACE MECHANISM

TECHNICAL FIELD

The invention relates generally to vehicle diagnostics, and more particularly relates to a system and method for providing a remote vehicle diagnostic display to a vehicle user.

BACKGROUND OF THE INVENTION

The increasing modularization and connectivity of vehicle subsystems has presented unique opportunities to access diagnostic information regarding the vehicle. For example, a vehicle computer can now collect information regarding the fuel, lubrication, and other subsystems and can make that information available to the user via an in-vehicle display, such as may be associated with a telematics unit.

Currently, certain providers periodically poll customer telematics units and provide gathered diagnostic data to the user remotely via an automated email notification. While this feature has proven invaluable to customers, there is and has been a need to provide even more timely information to customers. In addition, it is desirable to provide enhanced services to the users.

BRIEF SUMMARY OF THE INVENTION

While aspects of the invention will be discussed in detail below, this brief summary of the disclosure provides an overview of certain elements of the described examples.

A current popular vehicle diagnostics service sends monthly emails to customers with diagnostic and telematics service related information about their vehicle. This service utilizes circuit switched cellular communications between a providing entity such as a call center and the vehicle. Thus, while the service is invaluable to customers, the frequency with which data updates can be obtained can sometimes by limited by a lack of cost-effectiveness in the update mechanism.

In examples of the invention, a vehicle diagnostics update mechanism utilizes more effective cellular communication methods including packet data exchange and SMS messaging for example, to provide a more frequent connection to the vehicle telematics unit. In this way, large amounts of vehicle data that are available when the vehicle is on or cached, i.e., when the vehicle is off, can be pulled and used to provide a vehicle update to the user. In one example, a "vehicle dashboard" application running on a vehicle owner's computer in the form of a tool bar at the bottom of the screen provides diagnostics updates in a quick and easy to use format, The customer may set the frequency with which the data is updated. Alternatively or additionally, the vehicle may be setup to send data when a change in one or more of the relevant values occurs.

Other objects and advantages of the invention will become apparent upon reading the following detailed description and upon reference to the drawings.

DESCRIPTION OF AN EXEMPLARY EMBODIMENT

Before describing the invention in detail, an exemplary environment in which the invention may operate will be described. It will be appreciated that the environment is described for purposes of illustration only, and this description does not imply any limitation regarding the use of other environments to practice the invention.

Figure 1:
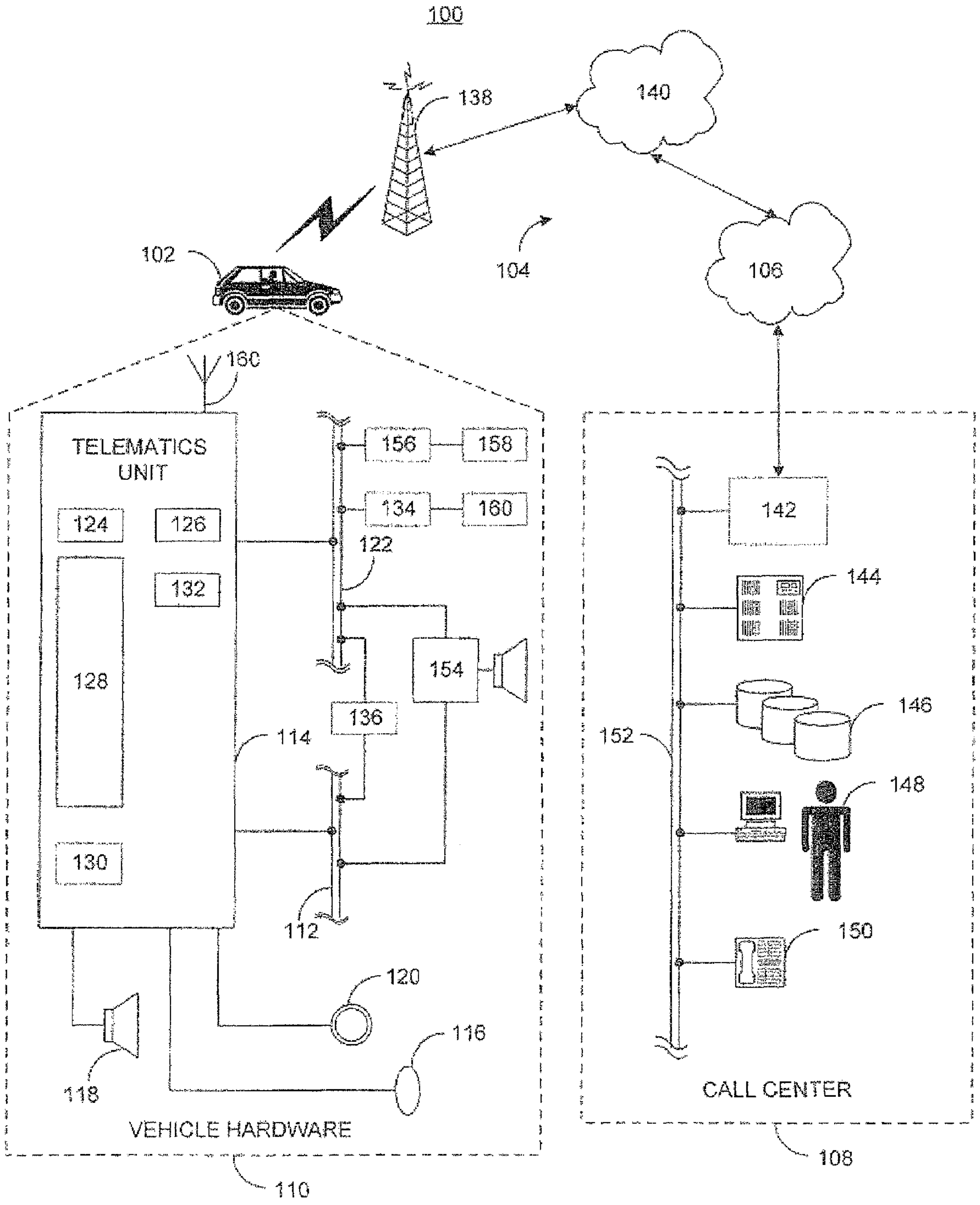
FIG. 1 is a schematic view of an example communication system within which examples of the present invention may be used.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 10 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic pushbutton used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Examples vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/based station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The methods of the following examples are ideally employed in an environment including a telematics-equipped vehicle and wholly or partially wireless communications infrastructure as described above by reference to FIG. 1. It will be appreciated that the illustration of FIG. 1 describes an exemplary system, and that many of the elements of FIG. 1 are not essential to the operation of the invention described in the various examples herein. The steps of the method that are performed remotely to the vehicle and the telematics unit may be performed by any appropriate device or facility, but in one example, the process is executed at the call center 108.

As noted above, it is desirable for a telematics service provider to make available to its customers enhanced diagnostic and telematics service related information about their vehicle. In an example, communications between a providing entity such as a call center and the vehicle are executed via packet data exchange and SMS messaging for example, to allow more frequent connection to the vehicle telematics unit, and hence to gather and provide more current vehicle information.

The vehicle data may be obtained by the provider when the vehicle is on, but may also be cached when the vehicle on and then pulled later when the vehicle may off be off during non-peak hours to conserve airtime resources. The gathered data is then used to provide a vehicle update to the user. In one example, a "vehicle dashboard" application running on a vehicle owner's computer, e.g., home computer, provides a tool bar at the bottom of the screen showing diagnostics updates in a quick and easy to use format. The update frequency and displayed information are settable by the user through the application. Alternatively or additionally, the vehicle may be setup to send data when a change in one or more of the relevant values occurs. Thus, the application may operate on either or both of a data push and data pull scheme.

In overview, the system pulls data (or receives pushed data) from the user's vehicle via the vehicle telematics unit, and transfers that data to the user's home computer or other computer to provide a vehicle diagnostic update. In an example, the communications between the central provider, e.g., call center 108, and the telematics unit are executed via cellular communication methods including one of packet data exchange and SMS messaging.

Figure 2:
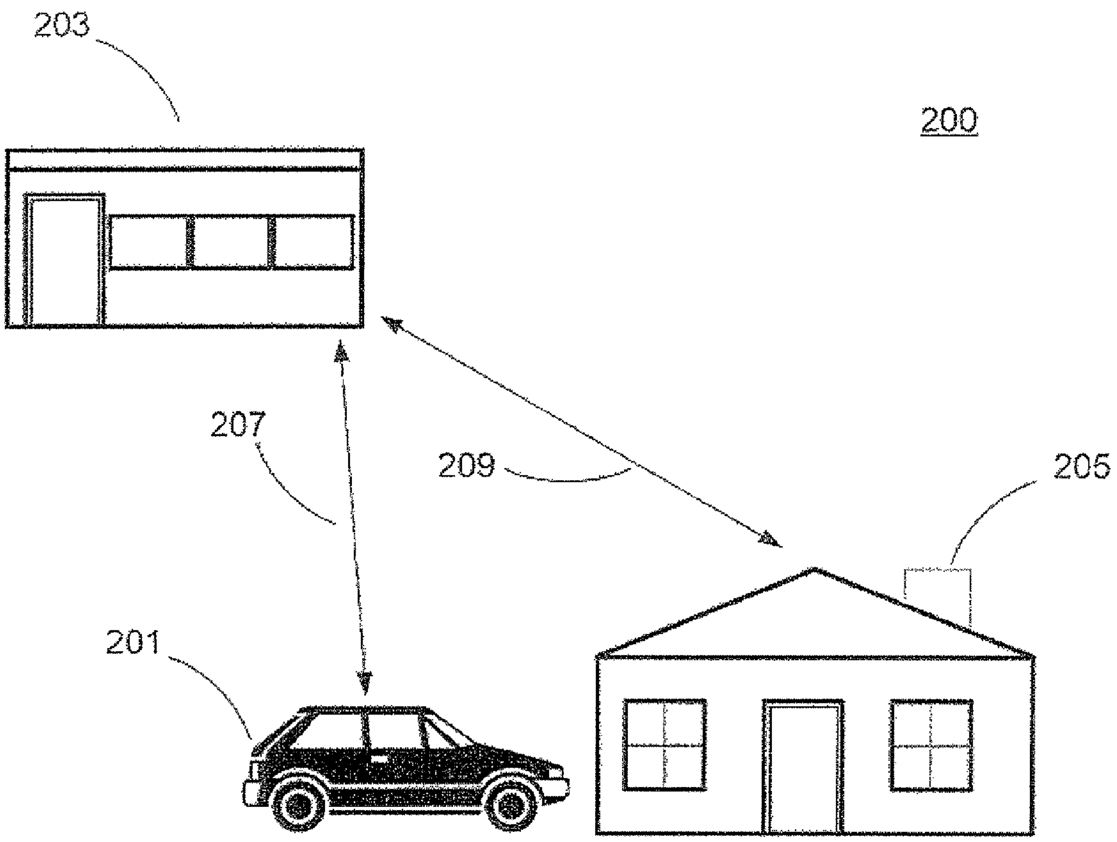
FIG. 2 is high level schematic view of a telecommunications system usable in examples of the invention, including a user's vehicle telematics unit, a central provider, and a user's dwelling.

FIG. 2 is simplified network diagram showing the connectivity of the system for accomplishing the noted data transfer activities. The telecommunications system 200 comprises a telematics unit associated with a user's vehicle 201, a central provider 203, and a user's dwelling 205. The central provider may be any entity capable of accessing the vehicle 201 data via the telecommunications unit and communicating with the user's computer, however, in one example, the central provider 203 comprises one or more of the elements described above with respect to the call center 108

The telematics unit associated with a user's vehicle 201 communicates with the central provider 203 as described above with respect to FIG. 1, and the link 207 between the telematics unit associated with a user's vehicle 201 communicates with the central provider 203 comprises one or more wireless links and may also comprise one or more wired links. The link 209 between the central provider 203 and the user's computer, e.g., at the user's dwelling 205, may comprise wired links, wireless links, or a combination of wired and wireless links. The link 209 may comprise circuit-switched and/or packed switched links, and in an example, the link 209 includes a wide area network such as the Internet.

Figure 3:
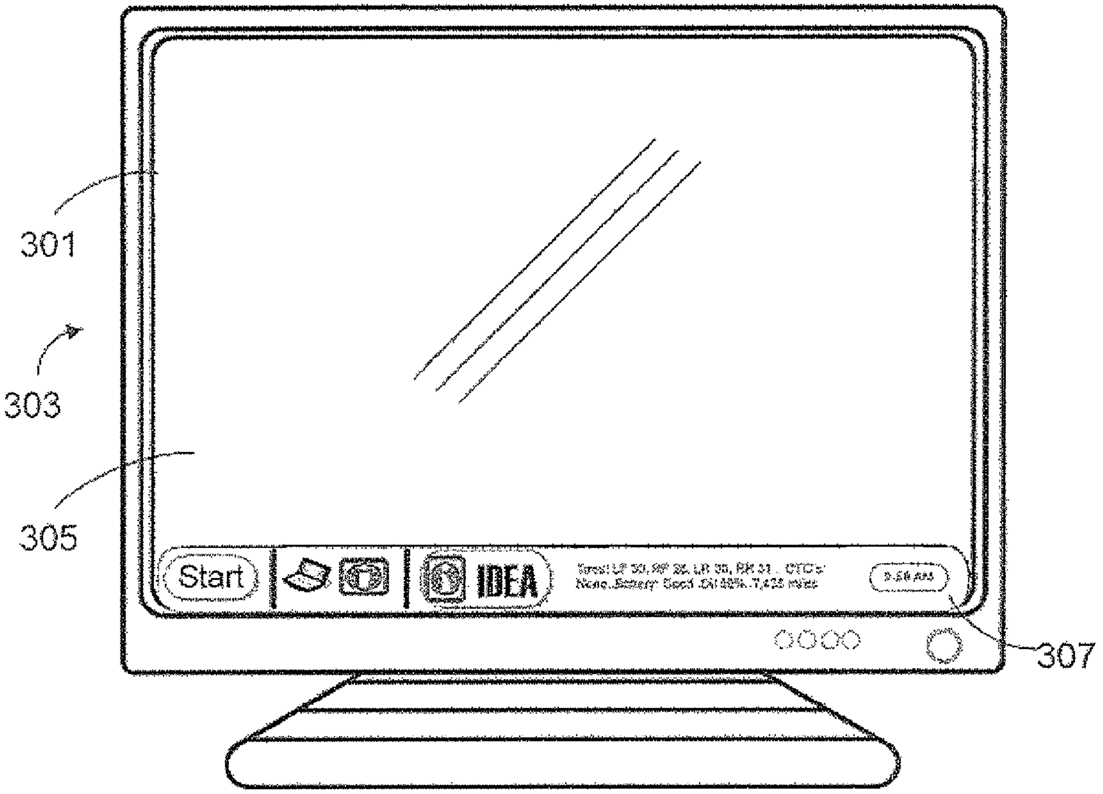
FIG. 3 is an abstracted screen representation of a user interface including a window environment and a task bar at the bottom of the window environment according to an example of the invention.

FIG. 3 is an abstracted screen representation of a user interface 301 displayed on the user computer monitor 303. In the illustrated example, the user interface 301 includes a window environment 305 and a task bar 307 at the bottom of the window environment 305. As will be appreciated by those of skill in the art, the task bar 307 provides an interface through which the user may activate and interact with certain applications, and also provides a status view to the user with respect to applications. The task bar 307 will be discussed in greater detail with respect to FIG. 4.

Figure 4:
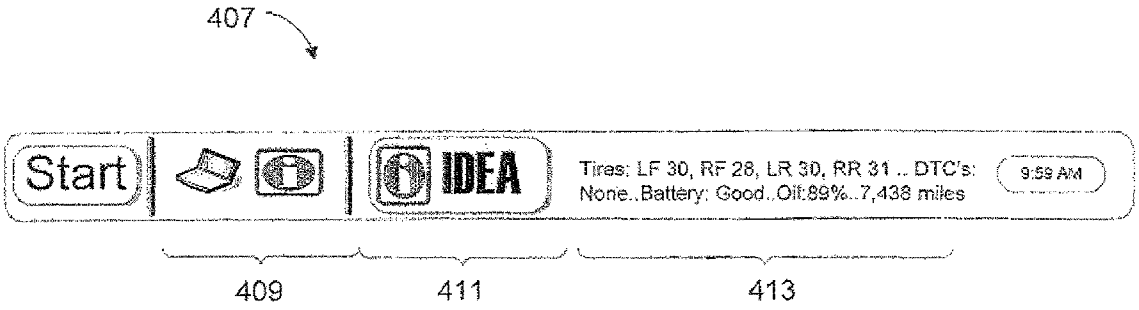
FIG. 4 is a detail view of a task bar at the bottom of the window environment according to an example of the invention.

FIG. 4 is a detail view of a task bar 307, 407 at the bottom of the window environment 305. A first area 409 of the task bar 407 may contain icons that are selectable to activate certain applications. A second portion 411 of the task bar contains a representation of running applications. In the illustrated example, an application entitled "IDEA" is running.

In an example of the invention, a third portion of the task bar 407 comprises a vehicle diagnostics update display 413. The vehicle diagnostics update display 413 comprises information, e.g., printed information, to convey vehicle status information to the user. In this manner, the user is immediately apprised of vehicle data of interest even when not physically present at the vehicle. In the illustrated example, the vehicle diagnostics update display 413 displays the following in textual format: "Tires: LF 30, RU 28, LR 30, RR 31—DTC's: None—Battery: Good—Oil: 89%—7,438 miles." This data conveys to the user that the left front tire of their car has a pressure of 30 PSI, the right front tire has a pressure of 28 PSI, the left rear tire has a pressure of 30 PSI, and the right rear tire has a pressure of 31 PSI. The field 413 also indicates that there are no diagnostic trouble codes (DTC's), that the vehicle battery is "good," that the oil in the vehicle has 89% of its life remaining, and that the vehicle has 7,438 miles on it. In a further example, the vehicle diagnostics update display 413 may also comprise an indication of currency, such as "Last updated: Aug. 16, 2006 @ 9:53 AM."

The vehicle diagnostics update display 413 is provided by an update application running on the user computer, e.g., in the windowing environment in the illustrated example. Although in the example of FIG. 4, the application collects information from the central provider and provides information to the user via the user interface, in a further example, the application also receives user input and responds accordingly. In a further example, user-selectable icons or buttons are provided, such that when they are selected, the application causes an associated service to be launched.

Figure 5:
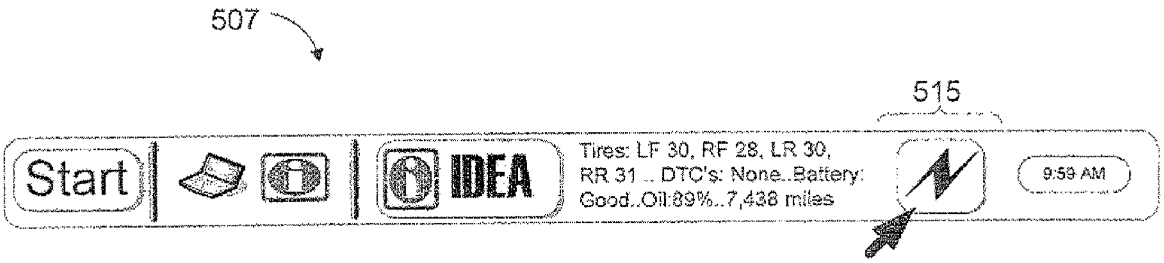
FIG. 5 is a detail view of a task bar having an integrated launch button according to an example of the invention.

For example, in the task bar 507 illustrated in FIG. 5, a launch button 515 is provided to enable a remote start function. In this example, when the user selects the launch button 515, the application receives the user selection via the operating system and causes an ignition signal to be sent to the central provider 203. The central provider 203 in turn provides an ignition signal to be provided to the vehicle 201 via the telematics unit therein.

Figure 6:
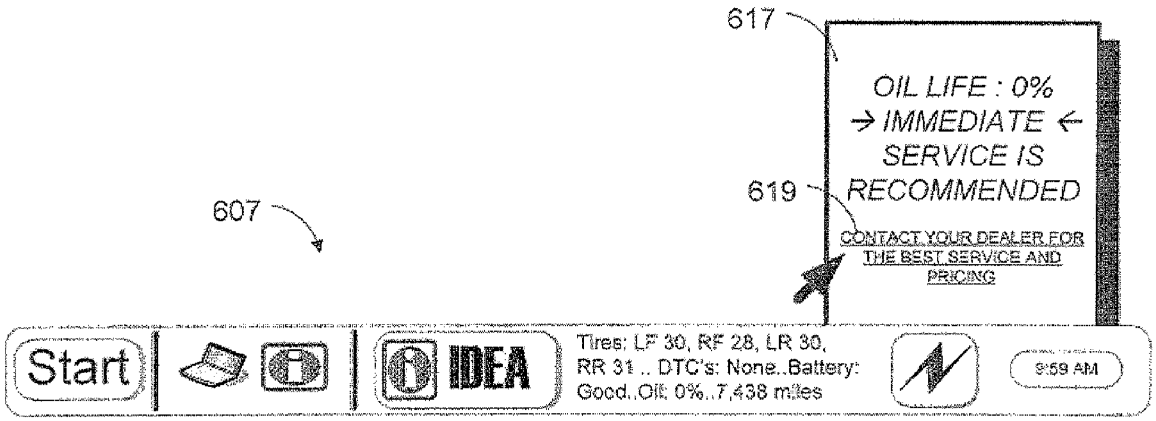
FIG. 6 is a detail view of a task bar having a pop-up alert according to an example of the invention.

The vehicle data application also provides more noticeable alerts under certain circumstances. For example, if a tire pressure, fuel level, etc. is below a predetermined set point or outside of an acceptable range (i.e. a tire is flat, the fuel tank has 5% remaining fuel) a pop-up notification is displayed in an example of the invention. FIG. 6 is a detail view of a task bar 607 showing a pop-up alert according to an example of the invention. In the illustrated example, the pop-up alert 617 appears outside of the task bar 607 and notifies the user that the oil life is exhausted and an oil change is recommended. The pop-up alert 617 may also display a link 619 selectable by the user to contact their dealer for service.

In addition to displaying information to the user and receiving input from the user, the application can also take autonomous action in a further example of the invention. For example, if the system detects a flat tire, it will automatically contact road service (e.g., via an automated phone call, email, or page, etc.) to provide location information and user account information.

The vehicle data application may be set as a start-up application in the associated computer so that it starts automatically when the computer boots without requiring user interaction or initiation. In this example, the service can also connect to an OEM database to determine if there are any software updates available for the vehicle and if so to give the option to download and update the vehicle software. For example, a pop-up announcing "Updates are available" may be provided, and a link to start the update may be provided as well.

As discussed above, the vehicle data application uses user-specific and vehicle specific information in certain examples and configurations. The user may provide much of this information, however, in a further example, the application retrieves as much information as possible from the central provider to minimize user set-up time.

Figure 7:
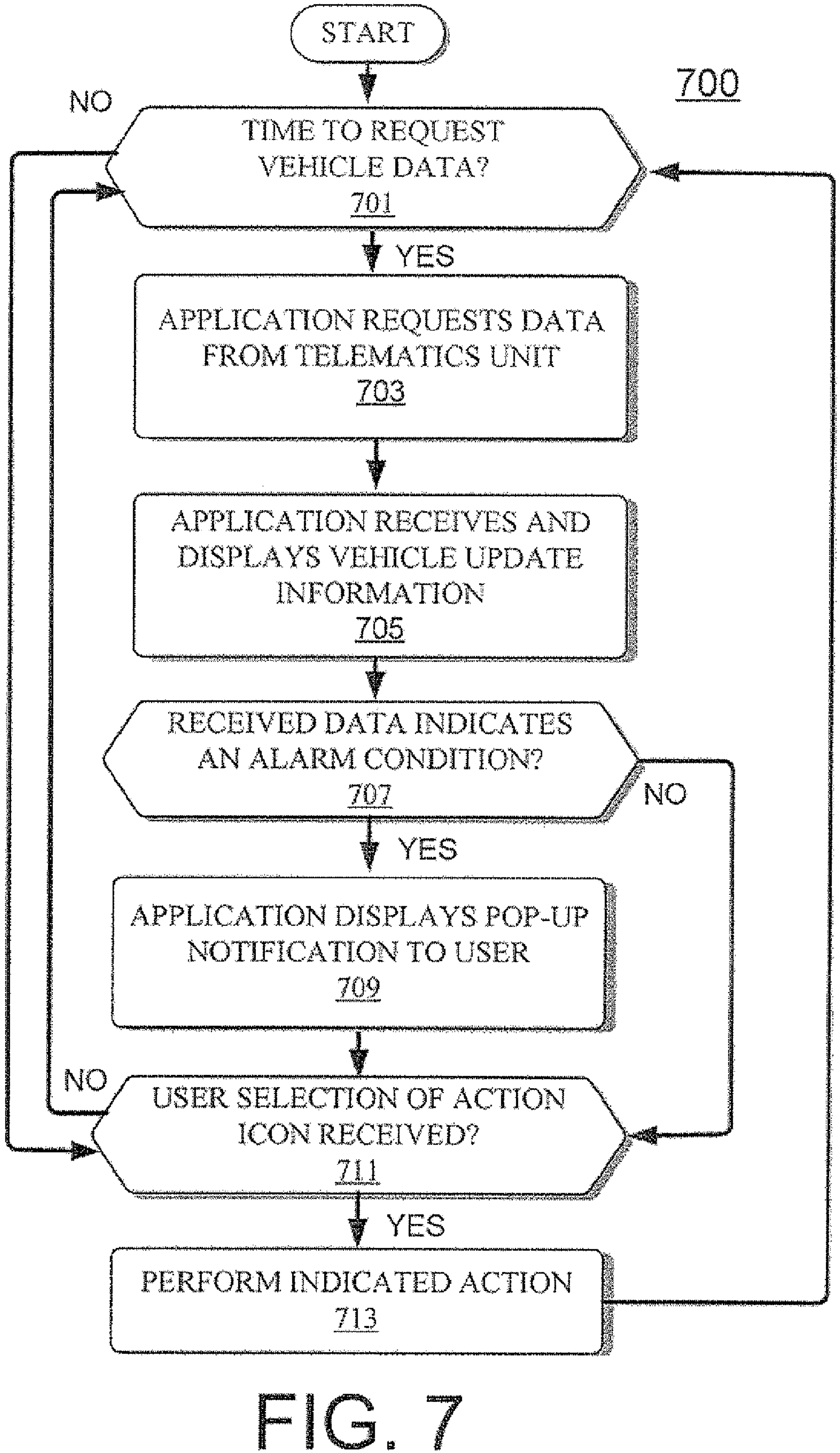
FIG. 7 is a flow chart showing a process of providing vehicle update information via a vehicle data application according to an example of the invention.

FIG. 7 is a flow chart showing a process of providing vehicle update information via a vehicle data application. At stage 701 of the process 700, the application determines whether it is time to request vehicle data. This determination can be based on expiration of a predetermined interval or other means. If it is determined that it is time to request vehicle data, the application requests the data at stage 703. Otherwise the process flows to stage 711. At stage 705, the application detects receipt of vehicle update information and displays the information on the user computer task bar.

At stage 707, the application determines whether the received data indicates an alarm condition, namely a condition that falls outside of predetermined acceptable limits as discussed above. If an alarm condition exists, the application displays a pop-up notification to the user at stage 709. Otherwise the process flows to stage 711. At stage 711, the application determines whether a user selection of an action icon (e.g., remote start) has been received. If it is determined that a user selection has been received, the process flows to stage 713 whereat the indicated action is performed. Otherwise, the process returns to stage 701 to repeat.

It will be appreciated that the foregoing methods and implementations for vehicle diagnostic information collection and display are merely examples, and that these illustrate a preferred technique. However, it is contemplated that other implementations of the invention may differ in detail from foregoing examples. As noted earlier, all references to the invention are intended to refer only to the example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing a remote vehicle status update with respect to a user vehicle to a user at a user personal computer remote from the user vehicle, the method comprising:

detecting that the user personal computer is booting, and in response to detecting that the user personal computer is booting, initiating a user information application on the user personal computer;

receiving vehicle diagnostic information from a remote telematics unit associated with the user vehicle;

displaying at least a portion of the received vehicle diagnostic information to the user via a task bar in a graphical user interface of the user personal computer;

displaying on the task bar a user-selectable action icon for causing a mechanical action to be remotely executed by the user vehicle; and receiving a user selection of the user-selectable action icon at the user personal computer and in response remotely causing the mechanical action associated with the icon to be executed by the user vehicle.

2. The method according to claim 1, wherein the step of receiving vehicle diagnostic information from a remote telematics unit comprises receiving the vehicle diagnostic information from a central provider that is in wireless communication with the remote telematics unit.

3. The method according to claim 1, wherein the mechanical action is a remote start of the user vehicle.

4. The method according to claim 1, further comprising displaying at least partly outside of the task bar in the graphical user interface of the user personal computer a notification that a vehicle diagnostic parameter is outside of an acceptable range.

5. The method according to claim 4, further comprising displaying in connection with the notification a user-selectable link for taking an action in response to the notification.

6. The method according to claim 1, wherein the vehicle diagnostic information comprises information selected from the group consisting of tire pressure, oil level, oil life, battery condition, a DTC, and vehicle mileage.

7. A computer-readable medium having thereon computer-executable instructions for providing a remote vehicle status update with respect to a user vehicle to a user at a user personal computer remote from the user vehicle, the instructions comprising:

instructions for detecting that the user personal computer is booting, and in response to detecting that the user personal computer is booting, initiating a user information application on the user personal computer;

instructions for receiving vehicle diagnostic information from a remote telematics unit associated with the user vehicle;

instructions for displaying at least a portion of the received vehicle diagnostic information to the user via a task bar in a graphical user interface of the user personal computer;

instructions for displaying on the task bar a user-selectable action icon for causing a mechanical action to be remotely executed by the user vehicle; and instructions for receiving a user selection of the user-selectable action icon at the user personal computer and in response remotely causing the mechanical action associated with the icon to be executed by the user vehicle.

8. The computer-readable medium according to claim 7, wherein the mechanical action is a remote start of the user vehicle.

9. The computer-readable medium according to claim 7, further comprising instructions for displaying at least partly outside of the task bar in the graphical user interface of the user personal computer a notification that a vehicle diagnostic parameter is outside of an acceptable range.

* * * * *